US012398727B1

(12) United States Patent
Grandadam

(10) Patent No.: US 12,398,727 B1
(45) Date of Patent: Aug. 26, 2025

(54) ELECTRIC LANTERN WITH FOLDABLE FAN BLADES

(71) Applicant: Cody Grandadam, Hennepin, IL (US)

(72) Inventor: Cody Grandadam, Hennepin, IL (US)

( * ) Notice: Subject to any disclaimer, the term of this patent is extended or adjusted under 35 U.S.C. 154(b) by 0 days.

(21) Appl. No.: 19/053,640

(22) Filed: Feb. 14, 2025

Related U.S. Application Data

(60) Provisional application No. 63/555,227, filed on Feb. 19, 2024.

(51) Int. Cl.

| | |
|---|---|
| ***F04D 25/08*** | (2006.01) |
| ***F04D 25/06*** | (2006.01) |
| ***F04D 27/00*** | (2006.01) |
| ***F04D 29/36*** | (2006.01) |
| ***F21V 33/00*** | (2006.01) |
| *F04D 29/64* | (2006.01) |

(52) U.S. Cl.
CPC ......... *F04D 29/36* (2013.01); *F04D 25/0673* (2013.01); *F04D 25/088* (2013.01); *F04D 27/004* (2013.01); *F21V 33/0096* (2013.01); *F04D 25/084* (2013.01); *F04D 25/086* (2013.01); *F04D 29/646* (2013.01)

(58) Field of Classification Search
CPC .. F04D 29/646; F04D 25/0673; F04D 25/088; F04D 25/084; F04D 25/086; F04D 29/36; F04D 29/08; F04D 19/002; F21V 33/0096; F21V 21/0885; F21V 21/0925; F21V 21/0965
See application file for complete search history.

(56) References Cited

U.S. PATENT DOCUMENTS

| | | | | | |
|---|---|---|---|---|---|
| 544,405 | A * | 8/1895 | Fleece | F04D 25/08 | 416/54 |
| 1,361,785 | A * | 12/1920 | Tucker | F04D 29/382 | 416/142 |
| 1,583,864 | A * | 5/1926 | Tucker | F04D 29/36 | 416/142 |
| 4,776,761 | A * | 10/1988 | Diaz | F04D 29/366 | 416/142 |
| 5,082,422 | A * | 1/1992 | Wang | F04D 25/088 | 362/234 |
| 6,161,994 | A * | 12/2000 | Lang | B23Q 11/10 | 29/DIG. 83 |

(Continued)

FOREIGN PATENT DOCUMENTS

KR 20190078422 A * 7/2019

OTHER PUBLICATIONS

KR 20190078422—translation from Espacenet (Year: 2019).*

*Primary Examiner* — Courtney D Heinle
*Assistant Examiner* — Behnoush Haghighian
(74) *Attorney, Agent, or Firm* — Justin Lampel

(57) ABSTRACT

An electric lantern with foldable fan blades is provided. The lantern has a plurality of vertically oriented light panels separated by non-illuminated sections. A plurality of fan blades are located at the bottom of the electric lantern. The fan blades rotate three hundred and sixty degrees. A hook is located at the top of the lantern so that the lantern may be hung in a room, tent or the like. When hung, the fan blades may rotate in a similar manner as a ceiling fan. When the fan blades are not in use they may be folded up and secured in the non-illuminated sections of the lantern.

10 Claims, 2 Drawing Sheets

(56) References Cited

U.S. PATENT DOCUMENTS

| | | | | |
|---|---|---|---|---|
| 6,213,716 | B1 * | 4/2001 | Bucher | F04D 29/388 416/142 |
| 6,354,801 | B1 * | 3/2002 | Gajewski | F04D 25/088 415/121.2 |
| 6,666,652 | B2 * | 12/2003 | Bucher | F04D 29/34 416/244 R |
| 6,688,850 | B2 * | 2/2004 | Bucher | F04D 29/34 416/220 A |
| 6,726,451 | B2 * | 4/2004 | Frampton | F04D 29/662 416/19 |
| 6,928,963 | B2 * | 8/2005 | Karanik | F04D 29/366 123/41.63 |
| 9,901,039 | B1 * | 2/2018 | Dellerson | A01G 9/249 |
| 10,208,946 | B2 * | 2/2019 | Roca | F21V 23/045 |
| 10,865,981 | B1 * | 12/2020 | Petrollini | F04D 29/005 |
| 11,293,449 | B2 * | 4/2022 | Chang | A47G 25/0692 |
| 11,371,528 | B2 * | 6/2022 | Noble | F04D 29/329 |
| 11,598,344 | B2 * | 3/2023 | Toy | F04D 27/00 |
| 2003/0129057 | A1 * | 7/2003 | Frampton | F04D 25/088 416/19 |
| 2012/0087796 | A1 * | 4/2012 | McMahon | F04D 29/34 416/210 R |
| 2018/0231240 | A1 * | 8/2018 | Roca | F21V 23/045 |
| 2019/0285078 | A1 * | 9/2019 | Toy | F04D 19/002 |
| 2020/0141047 | A1 * | 5/2020 | Chang | D06F 58/00 |
| 2020/0217327 | A1 * | 7/2020 | Noble | F04D 29/329 |
| 2025/0018080 | A1 * | 1/2025 | McCullough | F04D 29/388 |

* cited by examiner

ELECTRIC LANTERN WITH FOLDABLE FAN BLADES

CROSS REFERENCE TO RELATED APPLICATIONS

The following application is a based on and claims the priority benefit of U.S. provisional application Ser. No. 63/555,227 filed Feb. 19, 2024 currently; the entire content of which is incorporated by reference.

BACKGROUND OF THE INVENTION

An electric lantern with foldable fan blades is provided. The lantern has a plurality of vertically oriented light panels separated by non-illuminated sections. A plurality of fan blades are located at the bottom of the electric lantern. The fan blades rotate three hundred and sixty degrees. A hook is located at the top of the lantern so that the lantern may be hung in a room, tent or the like. When hung, the fan blades may rotate in a similar manner as a ceiling fan. When the fan blades are not in use they may be folded up and secured in the non-illuminated sections of the lantern.

Electric lanterns are known. For example, U.S. Pat. No. 6,337,437 to Fraas discloses a compact forced air cooled thermophotovoltaic generator having a TPV converter assembly, a fan which is driven by electric power generated by the converter assembly and a housing for enclosing the assembly and fan. The assembly includes a fuel/air mixing tube, an infrared emitter positioned in the combustion chamber, a receiver positioned around the emitter and a heat shield positioned between the receiver and the emitter. The receiver includes a circuit having TPV cells connected to an inner surface and radial fins extending from an outer surface. A fuel source may be provided proximate (i.e. beneath) the mixing tube or may be remotely connected to the mixing tube by a fuel line. A housing encloses the TPV converter assembly and the fuel source, if provided as part of the unit. A fan or other updraft mechanism electrically connected to the cell circuit is provided at the bottom of the housing beneath the fuel source and/or converter assembly. The fan blows air upward around the fuel cylinder and mixing tube, along the walls of the housing and past the radial fins of the heat sink, thereby dramatically improving cell cooling and increasing combustion air flow. A chimney and exhaust duct may be provided for carrying exhaust gases generated by the combustion away from the generator. Various features may be added, depending on the intended use of the generator. For portable applications, handles or other carrying means are included on the housing. For stationary applications, wall mounts or plates are provided. Preferably, the housing of the present generator has a construction that provides easy access for replacing depleted fuel sources.

Further, U.S. Pat. No. 5,262,728 to Shershen discloses a combination flashlight (or lantern)/continuity tester having an insulated body and a (flashlight) bulb and batteries in series circuit. The improved tester, which is formed in the flashlight (or lantern) body, includes an entry site of a particular configuration into the interior of the body. The testing means includes a pair of electrically-conductive strips, each strip having a contact portion, adjacent to the body entry site and penetrating into the interior of the body. Each strip is also in electrical contact with the series circuit. The shape of the entry site is such as to guide terminals of the circuit element being tested into contact with respective ones of the strips. The electrical continuity of a fuse or light bulb is determined by the lighting of the bulb being tested and/or by the lighting of the lamp bulb of the flashlight.

However, these patents fail to describe an electric lantern with foldable fan blades which is easy to use. Further, these patents fail to provide for an electric lantern with foldable fan blades which allows the fan blades to be quickly and securely folded onto the housing of the lantern.

SUMMARY OF THE INVENTION

An electric lantern with foldable fan blades is provided. The lantern has a plurality of vertically oriented light panels separated by non-illuminated sections. A plurality of fan blades are located at the bottom of the electric lantern. The fan blades rotate three hundred and sixty degrees. A hook is located at the top of the lantern so that the lantern may be hung in a room, tent or the like. When hung, the fan blades may rotate in a similar manner as a ceiling fan. When the fan blades are not in use they may be folded up and secured in the non-illuminated sections of the lantern.

An advantage of the present electric lantern with foldable fan blades is that the present lantern may act as both a lantern and a fan.

Another advantage of the present electric lantern with foldable fan blades is that the present lantern may collapse into a folded orientation for storage and/or transportation.

An advantage of the present electric lantern with foldable fan blades is that the blades may fold downward into the fab orientation by gravity.

And another advantage of the present electric lantern with foldable fan blades is that the present electric lantern with foldable blades may be powered by any power source including, for example, solar, USB powered, battery or external power sources.

Yet another advantage of the present electric lantern with foldable fan blades is that the present electric lantern with foldable blades may be water resistant.

Still another advantage of the present electric lantern with foldable fan blades is that the present electric lantern with foldable blades may allow a user to select the speed of the blades from different settings.

And another advantage of the present electric lantern with foldable fan blades is that the present electric lantern with foldable blades may be hung from a hook or may be placed on its side.

Another advantage of the present electric lantern with foldable fan blades is that the present electric lantern with foldable blades may have a safety feature which automatically shuts off the fan if the blades are obstructed. Further, the present lantern may be a surge protector.

Yet another advantage of the present electric lantern with foldable fan blades is that the present lantern may have a hook for hanging the lantern from a ceiling or a tent.

Still another advantage of the present electric lantern with foldable fan blades is that the present lantern may allow a user to select from various fan blade speeds.

And another advantage of the present electric lantern with foldable fan blades is that the present lantern may operate in both a ceiling mode and a side mode (box fan style).

For a more complete understanding of the above listed features and advantages of the electric lantern with foldable fan blades reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

An electric lantern with foldable fan blades is provided. The lantern has a plurality of vertically oriented light panels separated by non-illuminated sections. A plurality of fan blades are located at the bottom of the electric lantern. The fan blades rotate three hundred and sixty degrees. In an embodiment, the blades 50 may rote either clockwise or counterclockwise, as selected by the user; similar to a typical ceiling fan. A hook is located at the top of the lantern so that the lantern may be hung in a room, tent or the like. When hung, the fan blades may rotate in a similar manner as a ceiling fan. When the fan blades are not in use they may be folded up and secured in the non-illuminated sections of the lantern.

Figure 1:
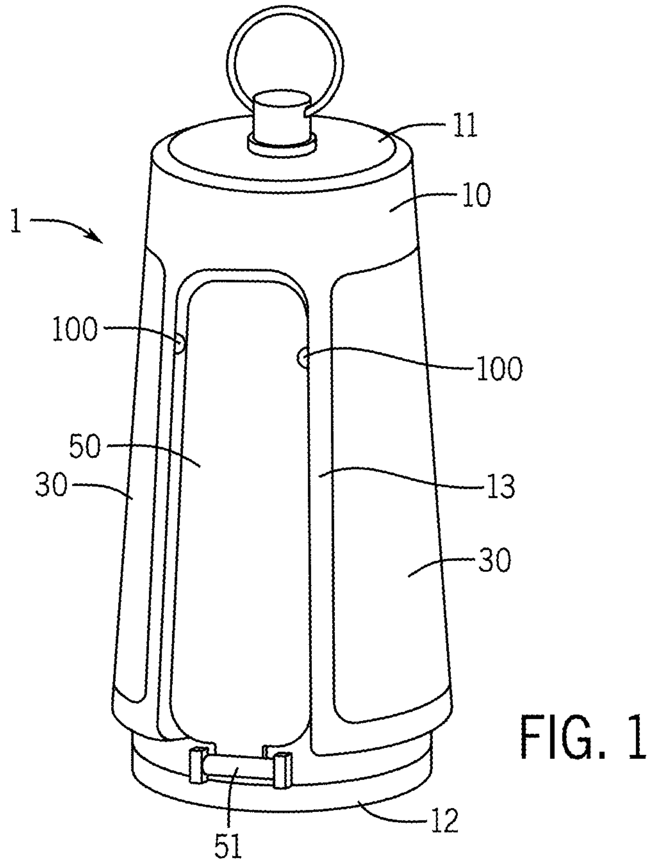
FIG. 1 illustrates a perspective view of the front of the lantern in the folded orientation.

Referring first to FIG. 1, in an embodiment a lantern 1 is provided. The lantern 1 has a housing 10 having a top 11, a bottom 12 and a side 13. In an embodiment, the lantern 1 is cylindrical or conical in shape (although other shapes may be utilized such as, for example, the lantern shown in FIG. 3). In an embodiment, the lantern 1 has an interior 20 having electrical components (not shown) such as a battery, lights and other components.

In an embodiment, a plurality of lights (or light panels) 30 may be present on the side 13 of the lantern 1. Each of the plurality of lights 30 may be, for example, generally rectangular in shape and vertically oriented. In an embodiment, the plurality of lights 30 may be LED lights. A plurality of non-illuminated surfaces 40 may be located between any two of the plurality of lights 30. Further, in an embodiment, the non-illuminated surfaces 40 may be generally indented rectangular areas which extend inward toward the interior 20 of the lantern 1.

In an embodiment, the lantern 1 may have a plurality of fan blades 50. The number of fan blades 50 may equal the number of non-illuminated surfaces 40. Further, the fan blades 50 may have a size and shape slightly smaller, but similar, to the size and shape of the intended area of the non-illuminated surfaces 40. The fan blades 50 may be secured at or near the bottom 12 of the lantern housing 10 and may rotate three hundred and sixty degrees just like typical ceiling fans. Further, in an embodiment, a user may select the fan speed based on various fan speed modes.

A hinge 51 may connect the fan blades 50 to the housing 10. The hinge 51 may allow the fan blades 50 to rotate approximately ninety degrees between a folded orientation (shown in FIG. 1) to an unfolded orientation (shown in FIG. 2). If a user wishes to use only the light function of the lantern 1, a user may elect to fold the fan blades 50 upward onto the side 13 of the housing 10 as shown in FIG. 1. Further, in the folded orientation the lantern 1 is easier to transport and/or store.

Figure 2:
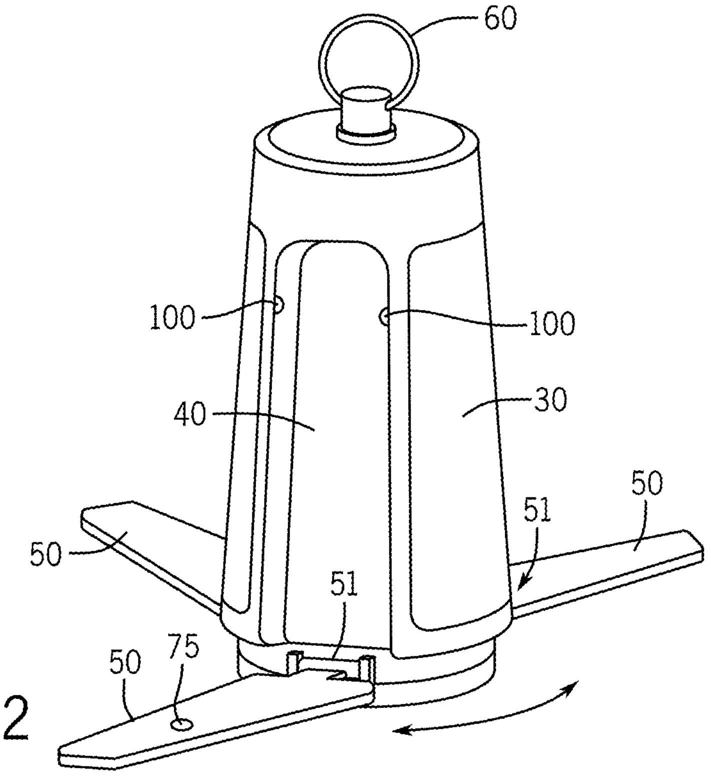
FIG. 2 illustrates a perspective view of the front of the lantern in the unfolded orientation.

If a use wishes to utilize the fan function of the lantern 1, the fan blades 50 will be unfolded into the second orientation of FIG. 2. Once all the fan blades 50 are unfolded, the fan function may be utilized and the lantern 1 may act as a fan moving air to cool individuals. In one embodiment, the lantern 1 is capable of electrically determining if all the fan blades 50 are in the unfolded orientation before a user may be allowed to active the fan function of the lantern 1. As a result, the lantern 1 may be prevented from causing injury or damage by improperly activating the fan function without all the blades 50 being in the unfolded orientation.

In an embodiment, the lantern's 1 footprint is drastically smaller when the lantern 1 is in the folded orientation of FIG. 1 compared to FIG. 2. For example, the lantern 1, in one embodiment, may have a diameter of approximately five inches in the folded orientation of FIG. 1 whereas the lantern 1 may have a diameter of approximately sixteen inches in the unfolded orientation of FIG. 2. In a embodiment, the blades 50 may unfold into the downward orientation of FIG. 2 by gravity.

Figure 3:
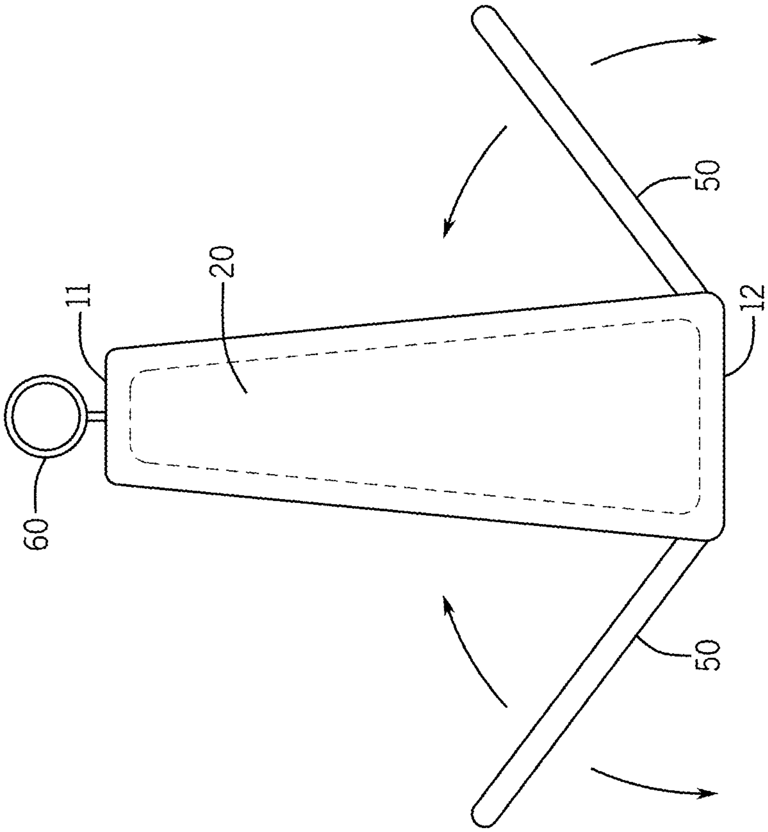
FIG. 3 illustrates a side view of the fan blades of the lantern in the process of being folded or unfolded.

In an embodiment, a hook or loop 60 may be located at the top 11 of the lantern 1. The hook or loop 60 may allow the lantern 1 to be hung from, for example, a ceiling or the interior of a tent, as is shown in FIG. 3.

In an embodiment, at least one securing tab 100 may be located on the side of the non-illuminated surface 40. The figures show two securing tabs 100, one on each side of each of the non-illuminated surface 40, however, alternative numbers of securing tabs 100 may be used. The securing tabs 100 may allow the fan blades 50 to snap into place within the non-illuminated surface areas 40 and to remain secured to the non-illuminated surface areas 40 of the housing 10 when the fan blades 50 are not in use. More specifically, the securing tabs 100 may prevent the fan blades from accidentally or improperly unfolding into the open orientation when not intended to be unfolded.

In an embodiment, each fan blade 50 may be magnetic or may have a magnet 75 which is attracted to a metal surface of the non-illuminated surface area 40. The magnet 75 may secure the fan blades 50 to the non-illuminated surface area 40 when the fan function is not desired to be utilized. Further, in an embodiment, the lantern 1 may utilize both the magnet 75 function and the securing tab 100 functions to secure the fan blades 50 in the vertical orientation when a user is not using the fan function of the lantern 1.

When the fan blades 50 are in the folded orientation of FIG. 1, the fan blades 50 do not interfere with the plurality of lights 30. The plurality of lights 30 may also be programed to allow different colors or flashing patterns.

Figure 4:
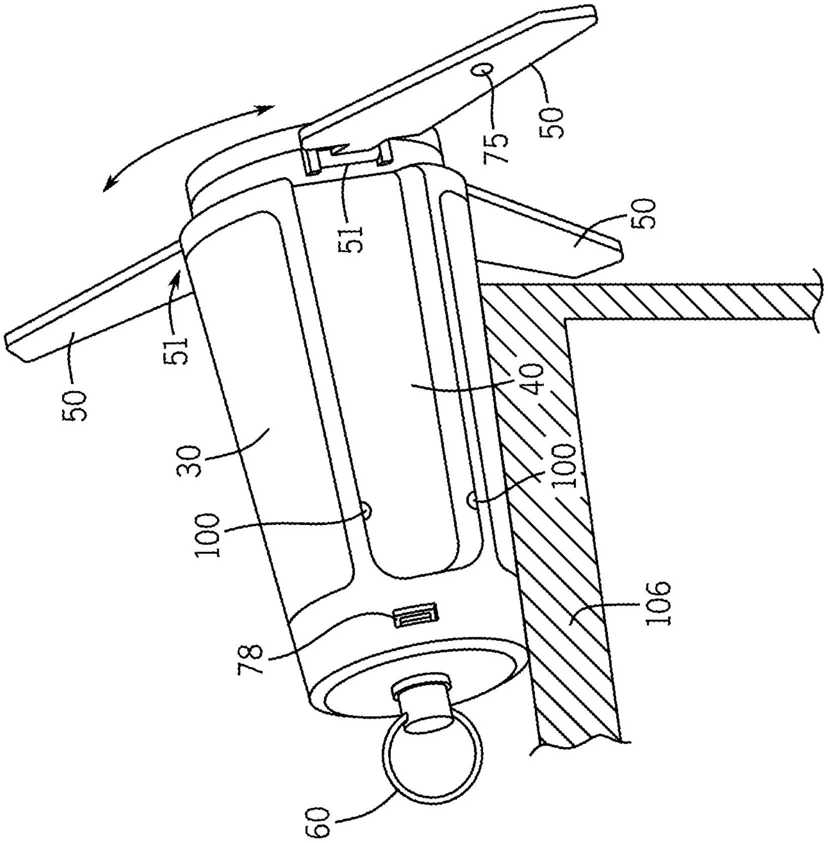
FIG. 4 illustrates an embodiment wherein the lantern is placed on its side so that the fan blades cool different areas of a room/tent.

In an embodiment, the lantern 1 may be placed on its side (as shown in FIG. 4) on a table 106 so that the lantern 1 acts as a typical table or floor fan. Therefore, the lantern 1 may be used in both ceiling mode (hanging from a ceiling) or side mode (wherein the lantern operates similar to a box fan). As a result, the lantern 1 may operate in a vertical or horizontal orientation. Therefore, a user may easily control the direction of the airflow within the surrounding area. Further, a user may select the speed of the fan blades 1 based on the desired air flow.

In an embodiment, the lantern 1 may have an electrical port such as a USB port, (for example USB-A) output 78 which may be used to power the lantern 1. Further, the lantern 1 may be powered by various different power sources such as, for example, batteries (DC), external power (AC), solar panels or any other power source. Further, in an embodiment, the USB port may be used to power other electronic devices such as, for example, cellular phones.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. An electric lantern with foldable fan blades comprising:

a main housing having a side wherein the side has a plurality of illuminated areas and a plurality of non-illuminated areas;

a plurality of fan blades that rotate around an axis and further flip upward and downward in a radial direction between a first orientation and a second orientation;

a hinge that allows the fan blades to rotate between a first orientation and a second orientation wherein in the first orientation the fan blades are folded upward and are attached to the main housing and wherein in the second orientation the fan blades are folded downward away from the main housing;

wherein each of the plurality of non-illuminated areas are surrounded by two illuminated areas and wherein each of the plurality of illuminated areas are surrounded by two non-illuminated areas;

wherein the plurality of non-illuminated areas are indented inward partially into the main housing with respect to the illuminated areas;

wherein the plurality of fan blades cover up the plurality of non-illuminated areas in the first orientation and therein the plurality of fan blades do not cover up the non-illuminated areas in the second orientation.

2. The electric lantern with foldable fan blades of claim 1 further comprising:

at least one securing tab located within each of the non-illuminated area wherein the securing tab secures the fan blades to the main housing in the first orientation.

3. The electric lantern with foldable fan blades of claim 1 further comprising:

at least one magnet located within the non-illuminated areas of the main housing.

4. The electric lantern with foldable fan blades of claim 3 further comprising:

at least one magnet located on or within the fan blades wherein the magnet of the fan blades is attracted to the magnet of the plurality of the non-illuminated areas of the housing.

5. The electric lantern with foldable fan blades of claim 1 further comprising:

a hook or loop secured to a top of the main housing.

6. The electric lantern with foldable fan blades of claim 1 wherein the lantern has at least a first speed for the fan blades and a second speed for the fan blades.

7. The electric lantern with foldable fan blades of claim 1 further comprising:

an electrical port located on the main housing wherein the electrical port is capable of charging a second electronic device.

8. The electric lantern with foldable fan blades of claim 7 wherein the electrical port is a USB port.

9. The electric lantern with foldable fan blades of claim 1 wherein the lantern is capable of operating in a vertical or horizontal orientation.

10. The electric lantern with foldable fan blades of claim 1 further comprising:

a power source wherein the power source comprises a rechargeable battery, a disposable battery or an external power source.

* * * * *